United States Patent [19]

Izawa et al.

[11] 4,368,393

[45] Jan. 11, 1983

[54] ROTATIONAL DIRECTION SENSOR

[75] Inventors: Minoru Izawa, Okazaki; Nobuhiro Takeda, Nagoya; Tasuku Nakano, Mizunami, all of Japan

[73] Assignees: Toyota Jidosha Kogyo Kabushiki Kaisha; Tokai Rika Co. Ltd., both of Aichi, Japan

[21] Appl. No.: 200,214

[22] Filed: Oct. 24, 1980

[30] Foreign Application Priority Data

Oct. 31, 1979 [JP] Japan .............................. 54-150010[U]

[51] Int. Cl.³ ........................ H01H 19/14; B60Q 1/00; H01H 3/16

[52] U.S. Cl. ................................. 307/115; 200/61.27; 200/61.31; 200/61.34; 200/61.35; 340/56; 340/73

[58] Field of Search ........................ 200/61.27–61.35, 200/61.54; 307/115, 122, 10 R, 10 LS; 340/56, 73

[56] References Cited

U.S. PATENT DOCUMENTS

| | | | |
|---|---|---|---|
| 2,343,778 | 3/1944 | Leonard | 200/61.31 |
| 2,667,545 | 1/1954 | Leonard | 200/61.31 |
| 2,725,435 | 11/1955 | Cislo | 200/61.34 |
| 2,828,377 | 3/1958 | Barnhard | 200/61.31 X |
| 3,368,043 | 2/1968 | Stoi et al. | 200/61.34 |
| 3,609,264 | 9/1971 | Suzuki et al. | 200/61.34 |
| 3,852,543 | 12/1974 | Suzuki | 200/61.3 X |
| 4,323,877 | 4/1982 | Morita et al. | 200/61.35 X |

*Primary Examiner*—J. R. Scott
*Attorney, Agent, or Firm*—Stevens, Davis, Miller & Mosher

[57] ABSTRACT

A rotational direction sensor for a body such as a steering shaft of an automobile, which is rotatable from a preferred neutral position in either the clockwise or the anticlockwise rotational direction. When an actuating assembly is rotated in the clockwise rotational direction by more than a predetermined amount from the neutral position, a first switch is actuated so as to conduct a first electric current, while a second switch is not actuated, and when the actuating assembly is then returned to the neutral position in the anticlockwise rotational direction, the second switch is actuated to conduct a second electric current. An opposite switch actuation sequence occurs for initial anticlockwise and then clockwise rotation of the actuating assembly. A control circuit generates a first electric signal when it receives the first and then the second electric current as a pair and a second electric signal when it receives the second and then the first electric current as a pair.

12 Claims, 7 Drawing Figures

ROTATIONAL DIRECTION SENSOR

BACKGROUND OF THE INVENTION

The present invention relates to a sensor for detecting the direction of rotation of a rotating body, and more particularly relates to a sensor for detecting whether a body is first rotated in the clockwise rotational direction and then subsequently is rotated in the anticlockwise rotational direction, or is first rotated in the anticlockwise rotational direction and then subsequently is rotated in the clockwise rotational direction.

The stimulus for the present invention has come from the development of vehicle turn signal indicators, and in particular from the development of self canceling vehicle turn signal indicators. A conventional direction indicating switch of an automobile or other automotive vehicle is generally mounted on the side of the steering column of the automobile, and usually comprises a control lever which is pushed upwards or downwards by hand by the driver of the vehicle according to the intended direction of turning of the vehicle. Typically, after making a signal which, for example, indicates his or her intention of turning left, and therefore after displacing the aforesaid lever into its anticlockwise biased position, wherein it remains, the driver of the vehicle then turns the steering wheel thereof first in the anticlockwise direction, so as to displace the steering mechanism of the vehicle to turn the vehicle to the left, and then subsequently, when the left turn has been almost completed, turns the steering wheel in the clockwise direction, so as to cancel this positioning of the steering mechanism, in order to straighten out after the left turn. It is conventional to arrange a self canceling mechanism by providing a projection or the like on the steering shaft, which trips the aforesaid direction indicating switch control lever back to its neutral position, during the aforesaid reverse turning of the steering shaft—in this case, the clockwise rotation thereof.

Since such a self canceling mechanism operates by mechanically returning the control lever of the direction indicating switch back to its neutral position when the steering wheel is turned back towards its neutral or straight ahead position, it is necessary for the direction indicating switch control lever to be pivotally mounted to a member proximate to the steering shaft, such as to a steering column outer tube. Accordingly in the prior art the mounting position of the direction indicating switch is extremely restricted, and thereby little freedom in the matter of design for this direction indicating switch has been available.

Nowadays, new conceptual design revolutions have occurred with regard to the instrument panel design of automobiles, in particular; and a strong demand has arisen for a system in which more freedom in arranging the mounting position of the direction indicating switch, or, more precisely, of the base of the control lever thereof, should be available. In other words, rather than the aforesaid prior art mechanical self canceling arrangement, it has become desirable for the flashing of the direction indicators to be electrically maintained, and for this flashing to be automatically canceled after a turn which has been indicated has been completed.

However, one of the difficulties in providing such an electrical direction signaling system is the requirement for provision of a sensor which electrically detects the rotational direction of the steering wheel; in more detail, for a sensor which is able to detect whether the steering wheel has been turned first in the clockwise rotational direction and then subsequently in the anticlockwise rotational direction, i.e. for a right hand turn, or has been turned first in the anticlockwise rotational direction and then in the clockwise rotational direction, i.e. for a left hand turn. Such a sensor should provide an electrical output signal or signals for releasing the electrical retention of the flashing of the direction indicators on one side or the other side of the vehicle.

Further, such a sensor should not be too sensitive. In other words, once a turn has been indicated by the driver of the vehicle via the direction indicating switch by displacing the control lever thereof, then this control lever should not be canceled or returned to its neutral position as a result only of slight motion of the steering wheel; only rotational movement of the steering wheel through an angle larger than a certain angle, in one direction and in the opposite direction, should be effective to trigger the rotational direction sensor to produce its output signal indicating steering rotation of the steering wheel has been finished. If this is not the case, slight to and fro movements of the steering wheel, during or just before a turn, will undesirably cancel the operation of the direction indicators of the vehicle, so that the turn is no longer properly signaled to other vehicle operators.

SUMMARY OF THE INVENTION

The present invention takes its point of departure from the recognition of the need for providing such a rotational direction sensor, and its primary object is to provide a rotational direction sensor which reliably can detect the rotational direction of a rotatable body such as a steering wheel of a vehicle, which has a simple structure and which is cheap to manufacture.

A further object of the present invention is to provide such a rotational direction sensor which provides either of a pair of different output signals, according to whether a rotatable body is first rotated in the clockwise rotational direction and then in the anticlockwise rotational direction, or is first rotated in the anticlockwise rotational direction and then in the clockwise rotational direction.

A further object of the present invention is to provide such a rotational direction sensor which is not triggered by movement of said rotatable body, in either rotational direction, by only a small amount; and which thus only detects rotational movement of said rotatable body through more than a certain predetermined rotational amount in either rotational direction.

A yet further object of the present invention is to provide such a rotational direction sensor, during the operation of which it is possible to discriminate, according to the order of actuation of a pair of switching means incorporated therein, whether a rotatable body to which the sensor is coupled is rotated clockwise and then anticlockwise, or anticlockwise and then clockwise.

A further object of the present invention is to provide such a rotational direction sensor which is particularly adapted to be fitted or to be coupled to the steering wheel of an automobile, in order to control the electrical canceling of a direction indicating switch thereof.

According to the present invention, these and other objects are achieved by, for a body which is rotatable in either the clockwise rotational direction or in the anticlockwise rotational direction about an axis: a rotational direction sensor, comprising: (a) an actuating assembly, which is rotated according to said rotation of said rotatable body; (b) a first means for switching electrical current, which is actuated by rotation of said actuating assembly in the clockwise rotational direction by more than a first predetermined amount, but which is not actuated by rotation of said actuating assembly in the anticlockwise rotational direction, irrespective of the amount of said rotation; and (c) a second means for switching electrical current, which is actuated by rotation of said actuating assembly in the anticlockwise rotational direction by more than a second predetermined amount, but which is not actuated by rotation of said actuating assembly in the clockwise rotational direction, irrespective of the amount of said rotation; (d) whereby, when said rotatable body rotates first in the clockwise rotational direction by more than said first predetermined amount and then subsequently in the anticlockwise rotational direction by more than said second predetermined amount, first said first switching means is actuated and then subsequently said second switching means is actuated, while, on the other hand, when said rotatable body rotates first in the anticlockwise rotational direction by more than said second predetermined amount and then subsequently in the clockwise rotational direction by more than said first predetermined amount, first said second switching means is actuated and then subsequently said first switching means is actuated; whereby, according to the order of actuation of said first and second switching means, it is possible to detect whether said rotatable body has been rotated clockwise and then anticlockwise, or anticlockwise and then clockwise, by a substantial amount such as to effect right or left turning of a vehicle by rotation of its steering wheel.

According to such a structure, with particular reference to its application to the case when the rotatable body is the steering wheel of an automobile, if from the straight ahead driving condition the automobile is to be steered through a left turn, for example, then first the steering wheel is turned in the anticlockwise rotational direction in order to move the steering mechanism of the automobile to its position so as to perform the left turn, thus actuating said second switching means, and then subsequently the steering wheel of the automobile is turned in the clockwise rotational direction in order to cancel the aforesaid positioning of the steering mechanism of the automobile, thus actuating said first switching means. Accordingly, in this case, first the electrical current provided to the second switching means is switched, and subsequently the electrical current provided to the first switching means is switched. On the other hand, if from the straight ahead driving condition the automobile is to be steered through a right turn, then first the steering wheel is turned in the clockwise rotational direction in order to move the steering mechanism of the automobile to its position so as to perform the right turn, thus actuating said first switching means, and then subsequently the steering wheel of the automobile is turned in the anticlockwise rotational direction in order to cancel the aforesaid positioning of the steering mechanism of the automobile, thus actuating said second switching means. Accordingly, in this case, first the electrical current provided to the first switching means is switched, and subsequently the electrical current provided to the second switching means is switched. Accordingly, by the order of receiving of the output electrical signals from the first switching means and from the second switching means, it is possible to control the canceling of the operation of the directional signal system of the vehicle. A circuit for doing this will be particularly explained hereinafter by way of example.

BRIEF DESCRIPTION OF THE DRAWINGS

The present invention will become more fully understood from the following description of several preferred embodiments thereof, which is to be taken in conjunction with the accompanying drawings. It should be clearly understood, however, that the description of the embodiments, and the drawings, are all of them provided purely for the purposes of illustration and exemplification only, and are in no way to be taken as limitative of the scope of the present invention. In the drawings.

DESCRIPTION OF THE PREFERRED EMBODIMENTS

Figure 1:
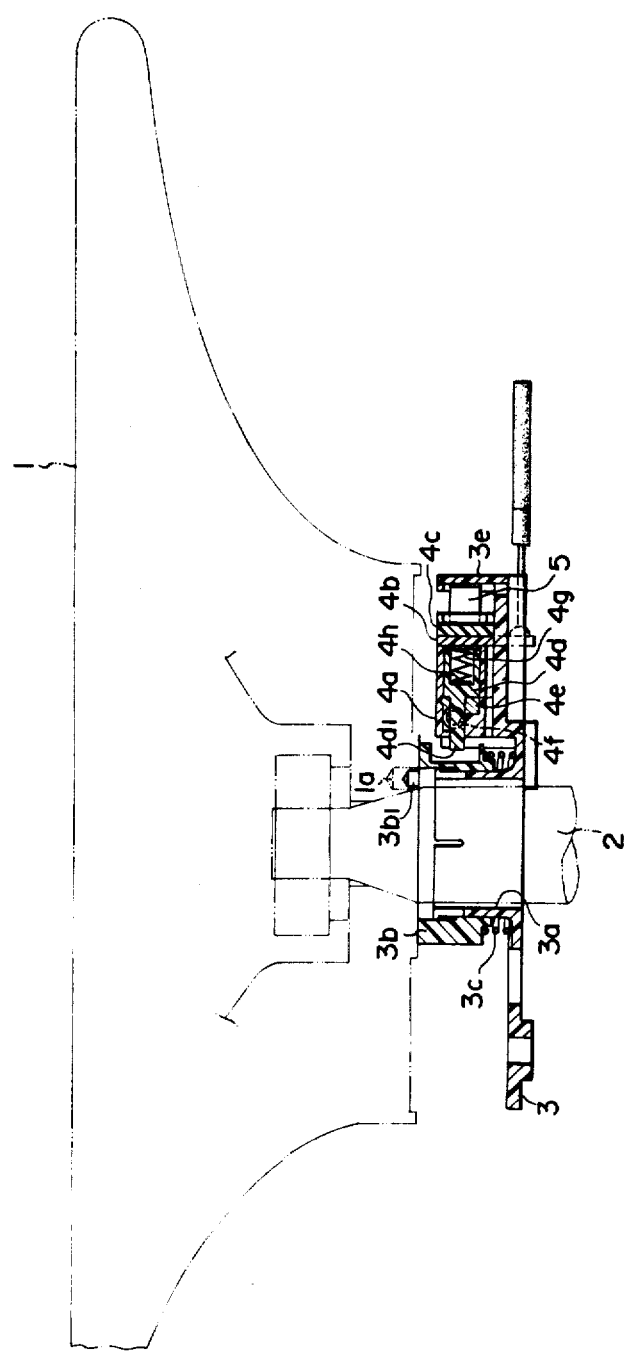
FIG. 1 is a sectional view, taken along the central axis of a steering shaft of an automobile, showing the essential parts of a first preferred embodiment of the rotational direction sensor according to the present invention, this first preferred embodiment being provided with a two way sliding switch which fulfils the functions of said first and second electrical switching means, and also showing in part dotted lines said steering shaft and a steering wheel mounted thereon, rotation of said steering shaft operating said rotational direction sensor.
Figure 2:
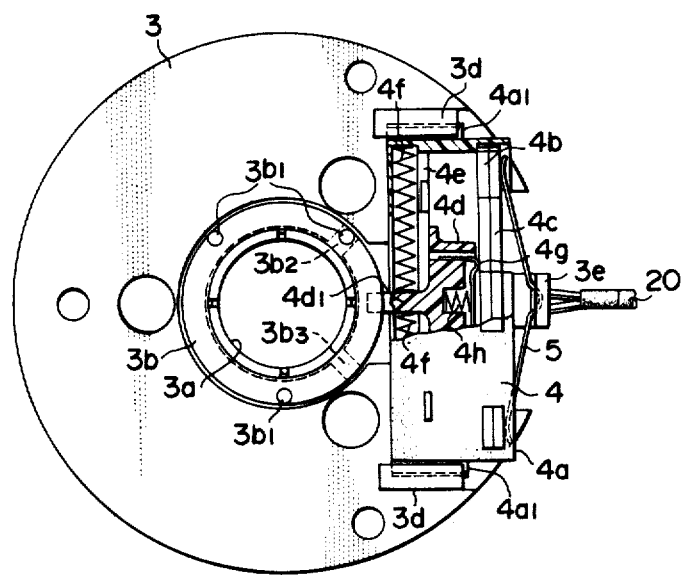
FIG. 2 is a plan view of the rotational direction sensor according to the first preferred embodiment of the present invention shown in FIG. 1, partly cut away so as to show the internal parts thereof.
Figure 3:
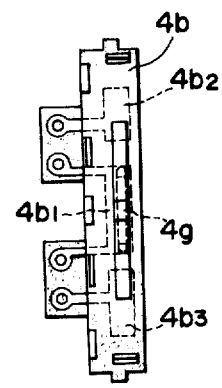
FIG. 3 is a plan view of a contact point base plate incorporated in the first preferred embodiment of the rotational direction sensor according to the present invention shown in FIGS. 1 and 2, and showing the configuration of certain electrical contact plates mounted thereon.

In FIGS. 1-3 of the accompanying drawings a first preferred embodiment of the rotational direction sensor according to the present invention is shown. The same parts, when they appear in more than one of these figures, are designated by the same reference characters in each of said figures.

The reference numeral 1 denotes a steering wheel of an automobile, and the reference numeral 2 denotes a steering shaft which is coupled to said steering wheel 1 by a coupling structure which is per se well known. These parts are only partially shown, by double dashed lines, because they are per se well known and conventional. A mounting plate 3 is fixed to a fixed part of the automobile such as a dash board or a steering column outer tube or the like, and extends generally transversely to the central rotational axis of the steering wheel 1 and the steering shaft 2. The steering shaft 2 passes through a hole in the mounting plate 3, and from the edge of this hole there extends axially along the steering shaft 2 towards the steering wheel 1 a tubular portion 3a of the mounting plate 3, which accordingly surrounds the steering shaft 2 like a shroud. Over the outer surface of this tubular portion 3a of the mounting plate 3 there is fitted rotatably a rotatable tube 3b, which is biased away from the main body of the mounting plate 3, towards the steering wheel 1, by a compression coil spring 3c.

The upper end surface in FIG. 1 of the rotatable tube 3b, i.e. its end surface which is in abutting contact with the steering wheel 1, is formed with three indexing projections 3b1 arranged at intervals of approximately 120° around its circumference, only one of which is visible in FIG. 1, but which are particularly shown in FIG. 2, which is a plan view of the assembly. Each of these indexing projections 3b1 opposes and enters into a corresponding indexing hole 1a formed on the lower surface in FIG. 1 of the steering wheel 1, i.e. on its surface which opposes the end of the rotatable tube 3b. Accordingly, by this construction, when the steering wheel 1 is mounted on the end of the steering shaft 2 in a manner so as to be rotationally coupled thereto, by the fitting of the indexing projections 3b1 into the indexing holes 1a the rotation of the rotatable tube 3b is coupled to the rotation of the steering wheel 1 and of the steering shaft 2, but, when the fixing means such as a fixing nut which secures the steering wheel 1 to the steering shaft 2 is removed, the steering wheel 1 may be removed from the steering shaft 2, and at this time the indexing projections 3b1 are simply and easily removed from the indexing holes 1a on the steering wheel 1. Thus easy disassembly is provided.

Advantageously, the modification can be provided that the indexing projections 3b1, and the indexing holes 1a, are spaced at intervals around the central axis of the steering wheel 1 and the steering shaft 2 which are substantially different from 120°. This is helpful, in order to ensure that the rotatable tube 3b can only be rotationally coupled to the steering wheel 1 in one rotational position, instead of being couplable thereto in three different rotational positions, as is the case in the shown first preferred embodiment.

On the outer circumferential surface of the rotatable tube 3b there are formed two projecting ribs 3b2 and 3b3, which extend along the axial direction of the rotatable tube 3b, and which project somewhat in the radial direction thereof. These projecting ribs 3b2 and 3b3 are not visible in the plane of the section of FIG. 1, but may be seen in end on view in FIG. 2. In the shown first preferred embodiment of the rotational direction sensor according to the present invention, the angle subtended between these projecting ribs 3b2 and 3b3, at the central axis of the steering wheel 1 and the steering shaft 2, is approximately 90°.

An electrical switch is generally designated by the reference numeral 4, and the outer casing 4a thereof is formed with two slide ribs 4a1 at its upper and lower ends as seen in FIG. 2, which are slidably engaged with slots formed in guide pieces 3d which are integrally formed along with the mounting plate 3. Thus, the electrical switch 4 is slidable to the left and the right in FIG. 2, towards and away from the central axis of the steering shaft 2 and the steering wheel 1 along a line perpendicular to this axis. In the casing 4a there is fitted a contact point base plate 4b which will be more particularly described later, which is backed by a fixing base plate 4c. A projection 3e extends from the mounting plate 3 on the side of the electrical switch 4 remote from the central axis of the steering shaft 2, and between this projection 3e and the back of the fixing base plate 4c there is provided a leaf spring 5, which accordingly by its elasticity biases the electrical switch 4 as a whole in the direction towards the central axis of the steering shaft 2. However, the motion of the electrical switch 4 due to this biasing action towards the central axis of the steering shaft 2 is restricted by stop constructions provided on the slotted guide pieces 3d which are not shown.

On the contact point base plate 4b, which is shown in plan view in FIG. 3, there are mounted three contact plates: a common contact plate 4b1 generally in the center of the contact point base plate 4b, a left contact plate 4b2 generally on the upper part in FIG. 3 of the contact point base plate 4b, and a right contact plate 4b3 generally on the lower part in FIG. 3 of the contact point base plate 4b. Electrical connections to these three contact plates 4b1, 4b2, and 4b3 are made by wires which are gathered into a cable 20, via a connector or the like.

Within the outer casing 4a of the electrical switch 4 there is slidably fitted a switch member 4d, which lies between the contact point base plate 4b and a guide plate 4e which is formed with a slot which extends in the upwards and downwards directions in FIG. 2. Through this slot in the guide plate 4e there projects an actuating projection 4d1 which extends from the switch member 4d. Into gaps on the side of the switch member 4d proximate to the contact point base plate 4b there are fitted projections which extend from a contact element 4g, and thus this contact element 4g is movable leftwards and rightwards in FIG. 2 with respect to the body of the switch member 4d, by these projections sliding in and out of these gaps. A compression coil spring 4h biases the contact element 4g in the direction away from the switch member 4d, so as to bring it into contact with the contact point base plate 4b. Further, two compression coil springs 4f are provided, which bear against opposite sides of the actuating projection 4d1 of the switch member 4d, and which thus by their opposition bias the switch member 4d to its neutral position, wherein its actuating projection 4d1 points approximately towards the central axis of the steering shaft 2, and wherein the contact element 4g makes contact only with the common contact plate 4b1 of the contact point base plate 4b, and does not make contact with either the left contact plate 4b2 or the right contact plate 4b3.

This switching device as described above operates as follows.

When the vehicle is being driven in the straight ahead condition, then neither of the projecting ribs 3b2 and 3b3 is in contact with the actuating projection 4d1 of the switch member 4d of the electrical switch 4 (in fact, in the shown embodiment, the actuating projection 4d1 of the electrical switch 4 lies approximately midway between these projecting ribs 3b2 and 3b3, at angles of approximately 45° from them both), and accordingly, by the biasing action of the compression coil springs 4f bearing on the actuating projection 4d1, the switch member 4d is brought to its neutral position wherein, as explained above, the contact element 4g is only in contact with the common contact plate 4b1, and is not in contact with either the left contact plate 4b2 or the right contact plate 4b3. Accordingly, in this condition, the common contact plate 4b1 is not electrically connected to either the left contact plate 4b2 or to the right contact plate 4b3.

If from this condition the steering wheel 1 of the automobile is turned in the anticlockwise rotational direction in FIG. 2, so as to steer the automobile around a left hand curve, then, provided this turning amount is greater than a certain predetermined angle, which in this embodiment is half of the angle subtended between the projecting rib 3b2 and the projecting rib 3b3 at the central axis of the steering shaft 2, i.e. is approximately 45°—it should be noted that the position of the members shown in FIG. 2 is the position in which the steering wheel 1 of the vehicle is so aligned that the vehicle is travelling in the straight ahead condition—then the projecting rib 3b3 comes into contact with the lower surface in FIG. 2 of the actuating projection 4d1 of the switch member 4d, and pushes the switch member 4d, via this actuating projection 4d1, upwards in the figure, against the biasing action of the upper compression coil spring 4f in FIG. 2, so that in this condition the contact element 4g mounted to the switch member 4d is brought into a position against the contact point base plate 4b wherein it electrically contacts both the common contact plate 4b1 mounted on the contact point base plate 4b and also the upper or left contact plate 4b2 mounted thereon, and accordingly provides an electrical connection between this common contact plate 4b1 and the left contact plate 4b2. However, in this condition, of course the common contact plate 4b1 is not electrically connected to the right or lower contact plate 4b3 mounted on the contact point base plate 4b. If now the steering wheel 1 of the vehicle is further turned in the anticlockwise direction from this condition, so as further to turn the vehicle around the left hand corner, then the projecting rib 3b3 will slip past the lower surface of the actuating projection 4d1 of the switch member 4d, and accordingly by the biasing action of the compression coil springs 4f the switch member 4d will be returned to its neutral position, wherein the contact element 4g mounted thereon is only in contact with the common contact plate 4b1 mounted on the contact point base plate 4b, and does not contact either the left contact plate 4b2 or the right contact plate 4b3 mounted thereon, and accordingly in this condition the contact plate 4b1 is brought out of electrical connection with the left contact plate 4b2, although of course it is not at this time electrically connected to the right contact plate 4b3.

Thus, in summary, during a progressive turning of the steering wheel 1 in the anticlockwise direction in FIG. 2, as the projecting rib 3b3 (or further the projecting rib 3b2) moves past and pushes for a brief time interval the actuating projection 4d1 of the electrical switch 4, for this brief interval an electrical connection is provided between the common contact plate 4b1 and the left contact plate 4b2. On the other hand, no electrical connection is made at any time, during the anticlockwise rotation of the steering wheel 1, between the common contact plate 4b1 and the right contact plate 4b3.

Now, when the left hand turn has been substantially completed, and the operator of the vehicle desires to cancel the steering action which was necessary in order to negotiate this turn, then he or she will turn the steering wheel 1 in the clockwise rotational direction. When this clockwise rotation has been performed by a certain amount, then one of the projecting ribs 3b2 and 3b3 comes into contact with the upper surface in FIG. 2 of the actuating projection 4d1 of the switch member 4d, and pushes the switch member 4d, via this actuating projection 4d1, downwards in the figure, against the biasing action of the lower compression coil spring 4f in FIG. 2, so that in this condition the contact element 4g mounted to the switch member 4d is brought into a position against the contact point base plate 4b where it electrically contacts both the common contact plate 4b1 mounted on the contact point base plate 4b and also the lower or right contact plate 4b3 mounted thereon, and accordingly provides an electrical connection between this common contact plate 4b1 and the right contact plate 4b3. However, in this condition, of course the common contact plate 4b1 is not electrically connected to the left or upper contact plate 4b2 mounted on the contact point base 4b.

If now the steering wheel 1 of the vehicle is further turned in the clockwise direction from this condition, so as further to cancel the turning alignment of the steering gear of the vehicle, then the projecting rib 3b2 or 3b3 which is pushing downwards the actuating projection 4d1 of the switch member 4d will slip past the upper surface of this projection 4d1, and accordingly by the biasing action of the compression coil springs 4f the switch member 4d will be returned to its neutral position, wherein the contact element 4g mounted thereon is only in contact with the common contact plate 4b1 mounted on the contact point base plate 4b, and does not contact either the left contact plate 4b2 or the right contact plate 4b3 mounted thereon, and accordingly in this condition the contact plate 4b1 is brought out of electrical connection with the right contact plate 4b3, although of course it is not at this time electrically connected to the left contact plate 4b2.

Thus, in summary, during this progressive turning of the steering wheel 1 in the clockwise direction in FIG. 2, as the projecting rib moves past and pushes for a brief time interval the actuating projection 4d1 of the electrical switch 4, for this brief interval an electrical connection is provided between the common contact plate 4b1 and the right contact plate 4b3. On the other hand, no electrical connection is made at any time, during this clockwise rotation of the steering wheel 1, between the common contact plate 4b1 and the left contact plate 4b2.

Similarly, in the case of a right hand turn, from the straight ahead steering condition the steering wheel 1 of the vehicle will be first turned in the clockwise rotational direction in FIG. 2, and then, provided this turning amount is greater than said certain predetermined angle of approximately 45°, the projecting rib 3b2 comes into contact with the upper surface in FIG. 2 of the actuating projection 4d1 of the switch member 4d, and pushes the switch member 4d, via this actuating projection 4d1, downwards in the figure, against the biasing action of the lower compression coil spring 4f in FIG. 2, so that in this condition the contact element 4g mounted to the switch member 4d is brought into a position against the contact point base plate 4b where it electrically contacts both the common contact plate 4b1 mounted on the contact point base plate 4b and also the lower or right contact plate 4b3 mounted thereon, and accordingly provides an electrical connection between this common contact plate 4b1 and the right contact plate 4b3. However, in this condition, of course the common contact plate 4b1 is not electrically connected to the left or upper contact plate 4b2 mounted on the contact point base plate 4b.

If now the steering wheel 1 of the vehicle is further turned in the clockwise direction from this condition, so as further to turn the vehicle around the right hand curve, then the projecting rib 3b2 will slip past the upper surface of the actuating projection 4d1 of the switch member 4d, and accordingly by the biasing action of the compression coil springs 4f the switch member 4d will be returned to its neutral position, wherein the contact element 4g mounted thereon is only in contact with the common contact plate 4b1 mounted on the contact point base plate 4b, and does not contact either the left contact plate 4b2 or the right contact plate 4b3 mounted thereon, and accordingly in this condition the contact plate 4b1 is brought out of electrical connection with the right contact plate 4b3, although of course it is not at this time electrically connected to the left contact plate 4b2.

Thus, in summary, during a progressive turning of the steering wheel 1 in the clockwise direction in FIG. 2, as the projecting rib 3b2 (or further the projecting rib 3b3) moves past and pushes for a brief time interval the actuating projection 4d1 of the electrical switch 4, for this brief interval an electrical connection is provided between the common contact plate 4b1 and the right contact plate 4b3. On the other hand, no electrical connection is made at any time, during the clockwise rotation of the steering wheel 1, between the common contact plate 4b1 and the left contact plate 4b2.

Now, when the right hand turn has been substantially completed, and the operator of the vehicle desires to cancel the steering action which was necessary in order to negotiate this turn, then he or she will turn the steering wheel 1 in the anticlockwise rotational direction. When this anticlockwise rotation has been performed by a certain amount, then one of the projecting ribs 3b2 and 3b3 comes into contact with the lower surface in FIG. 2 of the actuating projection 4d1 of the switch member 4d, and pushes the switch member 4d, via this actuating projection 4d1, upwards in the figure, against the biasing action of the upper compression coil spring 4f in FIG. 2, so that in this condition the contact element 4g mounted to the switch member 4d is brought into a position against the contact point base plate 4b where it electrically contacts both the common contact plate 4b1 mounted on the contact point base plate 4b and also the upper or left contact plate 4b 2 mounted thereon, and accordingly provides an electrical connection between this common contact plate 4b1 and the left contact plate 4b2. However, in this condition, of course the common contact plate 4b1 is not electrically connected to the right or lower contact plate 4b3 mounted on the contact point base plate 4b.

If now the steering wheel 1 of the vehicle is further turned in the anticlockwise direction from this condition, so as further to cancel the turning alignment of the steering gear of the vehicle, then the projecting rib 3b2 or 3b3 which is pushing upwards the actuating projection 4d1 of the switch member 4d will slip past the lower surface of this projection 4d1, and accordingly by the biasing action of the compression coil springs 4f the switch member 4d will be returned to its neutral position, wherein the contact element 4g mounted thereon is only in contact with the common contact plate 4b1 mounted on the contact point base plate 4b, and does not contact either the left contact plate 4b2 or the right contact plate 4b3 mounted thereon, and accordingly in this condition the contact plate 4b1 is brought out of electrical connection with the left contact plate 4b2, although of course it is not at this time electrically connected to the right contact plate 4b3.

Thus, in summary, during this progressive turning of the steering wheel 1 in the anticlockwise direction in FIG. 2, as the projecting rib moves past and pushes for a brief time interval the actuating projection 4d1 of the electrical switch 4, for this brief interval an electrical connection is provided between the common contact plate 4b1 and the left contact plate 4b2. On the other hand, no electrical connection is made at any time, during this anticlockwise rotation of the steering wheel 1, between the common contact plate 4b1 and the right contact plate 4b3.

Thus it will be understood that, according to the order in which electrical connection was made between the common contact plate 4b1 and either of the left contact plate 4b2 and the right contact plate 4b3, it may be determined whether the steering wheel 1 of the vehicle was first turned in the anticlockwise rotational direction in order to negotiate a left hand turn, and then was turned in the clockwise rotational direction in order to cancel the steering action necessary for this left hand turn, or whether on the other hand the steering wheel of the vehicle was first turned in the clockwise rotational direction in order to negotiate a right hand turn, and then was turned in the anticlockwise rotational direction in order to cancel the steering action necessary for this right hand turn. Of course, this function is only available from the construction as described above when the amount of turning of the steering wheel 1 of the vehicle, during the negotiation of the left or the right hand turn, is greater than a certain predetermined amount, which in the shown embodiment is the same predetermined amount, i.e. 45°, both for a left hand turn and for a right hand turn.

The reason for the electrical switch 4 to be slidably mounted on the mounting plate 3, by the slide ribs 4a1 being engaged into the slotted guide pieces 3d of the mounting plate 3, and for the switch 4 to be biased leftwards in FIG. 2 by the leaf spring 5 towards the central axis of the steering shaft 2, is in order positively to guard against the possibility that one or the other of the projecting ribs 3b2 or 3b3 might become jammed against the end of the actuating projection 4d1 of the switch member 4d. There is a risk of this occurring if the turning amount of the steering wheel 1 of the vehicle, during negotiation of a left or a right hand turn, before the steering wheel 1 is returned towards its normal or straight ahead position, should happen to be a certain critical amount. However, by the slidable mounting of the electrical switch 4 as biased by the leaf spring 5, any such jamming will be automatically relieved by the electrical switch 4 being moved rightwards in FIG. 2 against the biasing action of the leaf spring 5. Accordingly, this feature provides a very useful fail safe construction for the rotational direction sensor according to this first preferred embodiment of the present invention.

Figure 4:
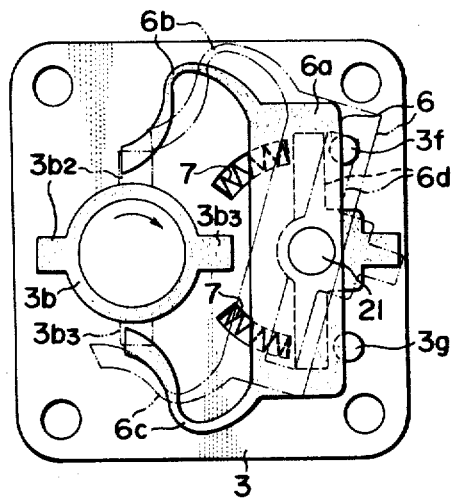
FIG. 4 is a plan view, similar to FIG. 2, showing the essential parts of a rotational direction sensor which is a second preferred embodiment of the rotational direction sensor according to the present invention, which incorporates a pivoting or rocking member with flexible prongs which is rocked to and fro according to clockwise or anticlockwise rotation of the steering shaft.

In FIG. 4, a rotational direction sensor which is a second embodiment of the rotational direction sensor according to the present invention is shown in a plan view, in a fashion similar to FIG. 2. In this figure, parts which are similar to parts in the first embodiment shown in FIGS. 1–3, and which have the same functions, are denoted by reference numerals which are the same as in those figures.

First, it should be understood that the general construction of this second embodiment of the rotational direction sensor according to the present invention, as seen in a plane perpendicular to the plane of the drawing paper in FIG. 4, is similar to the construction of the first embodiment as shown in FIG. 1. That is to say, the steering wheel 1, the steering shaft 2, the mounting plate 3 with its tubular portion 3a enshrouding a part of the steering shaft 2, and the rotatable tube 3b rotatably mounted over the tubular portion 3a of the mounting plate 3, are substantially of the same constructions as in the first embodiment. However, the arrangement of the projecting ribs 3b2 and 3b3 on the outer surface of the rotatable tube 3b, and the construction of the electrical switching system, is somewhat different in this second embodiment.

In more detail, as may be seen from the sectional view of the rotatable tube 3b which is presented in FIG. 4, the projecting ribs 3b2 and 3b3 formed on the outer surface of the rotatable tube 3b are, in this second preferred embodiment, spaced approximately at an 180° interval around the circumference thereof, instead of being, as was the case in the first embodiment and as may be seen in FIG. 2, spaced at an interval apart of approximately 90°. Further, in this second preferred embodiment, each of these projecting ribs 3b2 and 3b3 is somewhat stouter than the corresponding ribs were in the preceding embodiment, although these differences are only a matter of design.

Now, the arrangement of the electrical switching system in the second preferred embodiment will be described. On the mounting plate 3 a pronged switch member 6 is pivoted by a shaft which is perpendicular to the plane of the drawing paper in FIG. 4 and which is designated by the reference numeral 21. The pronged switch member 6 is formed of plastic or of some other material which has a certain degree of flexibility, especially when said material is extended into a thin member. The pronged switch member 6 is composed of a body portion 6a, the center of which is pivoted as explained above by the shaft 21 to the mounting plate 3, and of two prongs which extend from the upper and lower parts in FIG. 4 of the body portion 6a: a right turn or upper prong 6b, which projects from its upper part in FIG. 4, and a left turn or lower prong 6c, which projects from its lower part in FIG. 4. Each of these prongs is curved first outwards and then inwards, and their ends are approached quite close to the outer periphery of the rotatable tube 3b, i.e. closer thereto than the radial projecting length of the projecting ribs 3b2 and 3b3; and, further, the surface of each of these prongs 6b and 6c closest to the rotatable tube 3b, at the end of said prong, approaches the surface of the rotatable tube 3b at an obliquely slanting angle. The underside of the body portion 6a, i.e. the part on its side remote from the viewer as seen in FIG. 4, is fitted with a contact element 6d, the main part of which is hidden in FIG. 4 by the body portion 6a, but the form of which is shown by dashed lines; and mounted on the mounting plate 3 there are provided two contact plates: a right turn contact plate 3f and a left turn contact plate 3g. Two compression coil springs 7 are mounted within slots or the like formed in the mounting plate 3, and bear upon the body portion 6a near its opposite ends, so as, when no force is exerted on the right turn prong 6b or on the left turn prong 6c by either of the projecting ribs 3b2 or 3b3, to bias the pronged switch member 6 to its neutral position as shown by the solid lines in FIG. 4, wherein the extremities of the right turn prong 6b and of the left turn prong 6c are at approximately the same distance from the surface of the rotatable tube 3b, and wherein the contact element 6d does not come into contact with either the right turn contact plate 3f or the left turn contact plate 3g.

The operation of this second preferred embodiment is as follows.

If, starting from the straight ahead driving condition, as shown by the rotational arrow in FIG. 4 the steering wheel 1 of the vehicle and the steering shaft 2 and the rotatable tube 3b rotationally coupled thereto are rotated in the clockwise rotational direction, so as to turn the steering mechanism of the vehicle in the direction to execute a right turn, then, provided that this turning amount is greater than a certain predetermined amount, which in the shown second preferred embodiment is 90°, then the projecting rib 3b2, during this turning action, comes into abutting contact with the end of the right turn or upper prong 6b at its squared off end, and (substantially simultaneously) the projecting rib 3b3 comes into contact with the obliquely slanting surface of the left turn or lower prong 6c which is closest to the outer surface of the rotatable tube 3b. As the steering wheel 1 and the rotatable tube 3b rotationally coupled thereto are further somewhat rotated in the clockwise rotational direction from this condition, as is shown by the double dotted lines in FIG. 4, the projecting rib 3b3 pushes sideways the left turn or lower prong 6c by bending its elongated portion extending from its root portion towards its tip, because this projecting rib 3b3 is pressing against the aforesaid obliquely slanted surface near the tip of this left turn or lower prong 6c, while on the other hand the projecting rib 3b2, which is abutting directly against the squared off end of the upper or right turn prong 6b, pushes this upper prong 6b substantially outwards as seen by the double dotted lines in the figure, again bending the elongated portion of this upper prong 6b, which extends from its root portion towards its tip. The overall result of this asymmetrical action, as may be seen by the double dotted lines in the figure, is to turn the central body portion 6a of the pronged switch member 6 somewhat in the clockwise rotational direction as seen in FIG. 4, so as to bring the contact element 6d mounted thereon into electrical contact with the right turn contact plate 3f.

As the steering wheel 1 of the vehicle and the rotatable tube 3b rotationally coupled thereto are further turned in the clockwise rotational direction from this condition, in order to provide more and more turning action for the steering of the vehicle to execute the right turn, then of course the projecting ribs 3b2 and 3b3 move past and away from the ends of the right turn prong 6b and the left turn prong 6c respectively, and accordingly by the biasing action of the compression coil springs 7 the pronged switch member 6 is returned to its neutral position in which the contact element 6d makes electrical contact neither with the right turn contact plate 3f nor with the left turn contact plate 3g.

Thus, in summary, during a progressive turning of the steering wheel 1 in the clockwise direction in FIG. 4, as the projecting rib 3b3 (or further the projecting rib 3b2) moves past and pushes for a brief time interval the prong 6b of the pronged switch member 6, for this brief interval an electrical connection is provided between the contact element 6d and the contact plate 3f. On the other hand, no electrical connection is made at any time, during the clockwise rotation of the steering wheel 1, between the contact element 6d and the contact plate 3g.

Now, when the right turn has been almost completed, and it is desired to cancel the displacement of the steering of the vehicle which caused this right turn, then the steering wheel 1 and the rotatable tube 3b rotationally coupled thereto are rotated in the anticlockwise rotational direction as seen in FIG. 4, so as to cancel the right turn, and at this time, when this rotating amount becomes greater than a certain amount, then one of the projecting ribs 3b2 and 3b3, during this turning action, comes into abutting contact with the end of the left turn or lower prong 6c at its squared off end, and (substantially simultaneously) the other one of the projecting ribs 3b2 and 3b3 comes into contact with the obliquely slanting surface of the right turn or upper prong 6b which is closest to the outer surface of the rotatable tube 3b. As the steering wheel 1 and the rotatable tube 3b rotationally coupled thereto are further somewhat rotated in the anticlockwise rotational direction from this condition, the first projecting rib pushes sideways the right turn or upper prong 6b by bending its elongated portion extending from its root portion towards its tip, because this projecting rib is pressing against the aforesaid obliquely slanted surface near the tip of this right turn or upper prong 6b, while on the other hand the other projecting rib, which is abutting directly against the squared off end of the lower or left turn prong 6c, pushes this lower prong 6c substantially outwards, again bending the elongated portion of this lower prong 6c, which extends from its root portion towards its tip. The overall result of this asymmetrical action is to turn the central body portion 6a of the pronged switch member 6 somewhat in the anticlockwise rotational direction as seen in FIG. 4, so as to bring the contact element 6d mounted thereon into electrical contact with the left turn contact plate 3g.

As the steering wheel 1 of the vehicle and the rotatable tube 3b rotationally coupled thereto are further turned in the anticlockwise rotational direction from this condition, in order to provide more and more turning action for the steering of the vehicle in order to cancel the right turn, then of course the projecting ribs 3b2 and 3b3 move past and away from the ends of the right turn prong 6b and the left turn prong 6c, and accordingly by the biasing action of the compression coil springs 7 the pronged switch member 6 is returned to its neutral position in which the contact element 6d makes electrical contact neither with the right turn contact plate 3f nor with the left turn contact plate 3g.

Thus, in summary, during this progressive turning of the steering wheel 1 in the anticlockwise direction in FIG. 4, as the projecting rib moves past and pushes for a brief time interval the prong 6c of the pronged switch member 6, for this brief interval an electrical connection is provided between the contact element 6d and the contact plate 3g. On the other hand, no electrical connection is made at any time, during the anticlockwise rotation of the steering wheel 1, between the contact element 6d and the contact plate 3f.

On the other hand, in the case of a left turn, as the steering wheel 1 of the vehicle and the steering shaft 2 and the rotatable tube 3b rotationally coupled thereto are first rotated in the anticlockwise rotational direction, and secondly are rotated in the clockwise rotational direction, first the electrical connection between the contact element 6d and the left turn contact element 3g occurs, and secondly the electrical connection between the contact element 6d and the right turn contact element 3f only occurs, in a similar but reversed manner to the operation described above with regard to a right turn of the vehicle.

In this embodiment, no anti jam mechanism, such as the sliding arrangement employing the ribs 4d1 as provided in the first embodiment shown in FIGS. 1-3, of the electrical switch 4 with respect to the mounting plate 3 is provided, because there is no possibility that the projecting rib 3b2 or the projecting rib 3b3 should jam against either the right turn prong 6b or the left turn prong 6c, because of the flexibility of these prongs. Accordingly, this construction has the advantage of simplicity.

In the case of this construction, electrical output connections are made to the contact element 6d, the right turn contact plate 3f, and the left turn contact plate 3g. Thus, it is seen that when the vehicle is steered through a right turn, first electrical connection is made between the contact element 6d and the right turn contact plate 3f, and subsequently electrical connection is made between the contact element 6d and the left turn contact plate 3g. Similarly, if the vehicle is steered through a left turn, first electrical connection is made between the contact element 6d and the left turn contact plate 3g, and subsequently electrical connection is made between the contact element 6d and the right turn contact plate 3f. Accordingly, from the order in which electrical connection is made between the contact element 6d and either of the left turn contact plate 3g and the right turn contact plate 3f, it may be determined whether the steering wheel 1 of the vehicle was first turned in the anticlockwise rotational direction in order to negotiate a left hand turn, and then was turned in the clockwise rotational direction in order to cancel the steering action necessary for this left hand turn, or whether on the other hand the steering wheel of the vehicle was first turned in the clockwise rotational direction in order to negotiate a right hand turn, and then was turned in the anticlockwise rotational direction in order to cancel the steering action necessary for this right hand turn. Of course, this function is only available from the construction as described above when the amount of turning of the steering wheel 1 of the vehicle, during the negotiation of the left or the right hand turn, is greater than a certain predetermined amount, which in the shown embodiment is the same predetermined amount, 90°, both for a left hand turn, and for a right hand turn.

Figure 5:
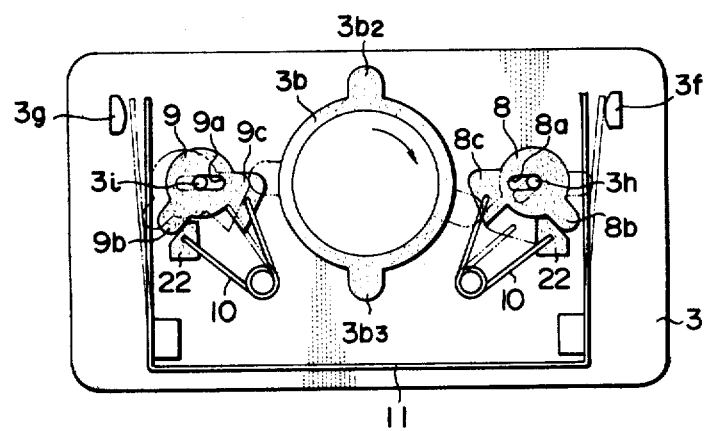
FIG. 5 is a plan view, similar to FIGS. 2 and 4, showing the essential parts of a rotational direction sensor which is a third preferred embodiment of the rotational direction sensor according to the present invention, in which the first and second electrical switching means are provided quite separately with regard to their physical structure, each incorporating a switch actuating member formed with a slot which is mounted on a mounting pin, said member being able either to turn around this mounting pin or to be laterally displaced with respect thereto, so that said slot moves along said pin.

In FIG. 5, a rotational direction sensor is shown which is a third preferred embodiment of the rotational direction sensor according to the present invention. In this figure, again, parts which are similar to parts in the first and the second preferred embodiments shown respectively in FIGS. 1-3 and in FIG. 4, and which have the same functions, are denoted by reference numerals which are the same as in those figures.

Further, again, it should be understood that the general construction of this third preferred embodiment of the rotational direction sensor according to the present invention, as seen in a plane perpendicular to the plane of the drawing paper in FIG. 5, is similar to the construction of the first preferred embodiment as shown in FIG. 1, and also to the construction of the second preferred embodiment. That is to say, the steering wheel 1, the steering shaft 2, the mounting plate 3 with its tubular portion 3a enshrouding a part of the steering shaft 2, and the rotatable tube 3b rotatably mounted over the tubular portion 3a of the mounting plate 3, are substantially of the same constructions as in the first and the second preferred embodiments. However, the arrangement of the projecting ribs 3b2 and 3b3 on the outer surface of the rotatable tube 3b, and the construction of the electrical switching system, is somewhat different in this third preferred embodiment.

FIG. 5 shows the mounting plate 3, and the switching devices attached thereto, in a plan view similar to FIGS. 2 and 4 showing the first and second embodiments. In this embodiment, the general form of the rotatable tube 3b is similar to its form in the second embodiment shown in FIG. 4, except that the projecting ribs 3b2 and 3b3 are not formed with square outer ends, but are rounded off. The projecting ribs 3b2 and 3b3 in this third preferred embodiment are, similarly to those in the second embodiment shown in FIG. 4, spaced at approximately 180° around the periphery of the rotatable tube 3b.

In this third preferred embodiment, two entirely mechanically separate switching devices are provided. In detail, projecting from the mounting plate 3 in the direction perpendicular to the plane of the drawing paper in FIG. 5 there extend a right mounting pin 3h and a left mounting pin 3i. A right turn switch member 8 is formed with a slot 8a therein, which is engaged over the right mounting pin 3h, and with a contact spring engaging projection 8b and a rib engaging projection 8c thereon. The form of the right turn switch member 8 may be seen in FIG. 5. Further, a left turn switch member 9 is formed with a slot 9a therein, which is engaged over the left mounting pin 3i, and with a contact spring engaging projection 9b and a rib engaging projection 9c thereon. The right turn switch member 8 is biased so as to be rotated in the clockwise direction, and so as also to be pulled to the left with respect to the right mounting pin 3h, by a torsion coil spring 10, the ends of which project in the direction perpendicular to the plane of the drawing paper in FIG. 5 into holes, one of which is formed in the rib engaging portion 8c of the right turn switch member 8, and the other of which is formed in a stop member 22 formed on the mounting plate 3. Similarly, the left turn switch member 9 is biased so as to be rotated in the anticlockwise direction, and so as also to be pulled to the right with respect to the left mounting pin 3i, by another torsion coil spring 10, the ends of which, again, project in the direction perpendicular to the plane of the drawing paper in FIG. 5, into holes, one of which is formed in the rib engaging portion 9c of the left turn switch member 9, and the other of which is formed in another stop member 22 formed on the mounting plate 3. The alignments of these parts, when the projecting ribs 3b2 and 3b3 are not displacing the right turn switch member 8 and the left turn switch member 9, are as shown by the solid lines in FIG. 5.

There is provided a contact spring member 11 which is formed with a central portion and with two leaf portions which extend past the sides of the right and left turn switch members 8 and 9 remote from the rotatable tube 3b, and the ends of which are proximate to right and left contact points 3f and 3g and located inwardly thereof. Again, the position of this contact spring member 11, when it is not displaced by engagement with the contact spring engaging projection 8b or the contact spring engaging projection 9b, is as shown by the solid lines in FIG. 5.

The operation of this third preferred embodiment of the rotational direction sensor according to the present invention is as follows.

When the vehicle is being driven in the straight ahead condition, the position of the rotatable tube 3b with the projecting ribs 3b2 and 3b3 thereon is as shown by the solid lines in the figure. When the driver of the vehicle desires to negotiate, for example, a right hand turn, he turns the steering wheel 1 of the vehicle and the rotatable tube 3b rotatably coupled thereto in the clockwise direction as shown by the rotational arrow in FIG. 5, and, provided that this turning is by at least a predetermined amount, the projecting rib 3b2 comes into contact with the rib engaging projection 8c of the right turn switch member 8, and substantially simultaneously the projecting rib 3b3 comes into engagement with the obliquely angled side of the rib engaging projection 9c of the left turn switch member 9. Because of the particular configuration of the parts, as shown, as the steering wheel 11 of the vehicle and the rotatable tube 3b coupled thereto are further turned in the clockwise direction from this condition, the pressure of the projecting rib 3b2 on the rib engaging projection 8c of the right turn switch member 8 tends to rotate the right turn switch member 8 about the right mounting pin 3h, without substantially displacing this right turn switch member 8 so as to move the slot 8a along the right mounting pin 3h in the longitudinal direction of the slot 8a, and accordingly the right turn switch member 8 is substantially only displaced in a rotational fashion, and thereby the torsion coil spring 10 connected to the right turn switch member 8 is compressed, and the right turn switch member 8 is moved to its position shown by double dotted lines in FIG. 5, so that the contact spring engaging projection 8b thereof displaces the right hand part of the contact spring member 11 in FIG. 5 very substantially in the right hand direction so that said contact spring member 11 comes into contact with the right contact point 3f. On the other hand, the pressure of the projecting rib 3b3 on the obliquely sloping surface of the left turn switch member 9 does not rotate the left turn switch member 9, because such a turn is prohibited by the stop member 22, but pushes it along the left mounting pin 3i, so that the slot 9a in the left turn switch member 9 is slid in its longitudinal direction along the left mounting pin 3i, somewhat compressing the torsion coil spring 10 connected to the left turn switch member 9, so that the left turn switch member 9 is moved to its position shown by double dotted lines in FIG. 5, pushing against the left hand portion of the contact spring member 11 so as to displace it to a certain extent leftwards, but not so far as to bring said contact spring member 11 into contact with the left contact point 3g. Thus, in this condition, the contact spring member 11 is brought into electrical contact with the right contact point 3f, but not with the left contact point 3g.

As the steering wheel 1 of the vehicle and the rotatable tube 3b rotationally coupled thereto are further rotated in the clockwise direction from this condition, the projecting rib 3b2 (or further the projecting rib 3b3) and the projecting rib 3b3 (or further the projecting rib 3b2) move past the rib engaging projection 8c of the right turn switch member 8 and the rib engaging projection 9c of the left turn switch member 9, respectively, and accordingly these switch members 8 and 9 are released so as to be biased by the respective torsion coil springs 10 coupled thereto back to their positions shown in FIG. 5 by the solid lines, i.e. their neutral positions. And in this case the left and right hand sides in FIG. 5 of the contact spring member 11 are also returned to their positions shown by the solid lines, so that the contact spring member 11 is not in electrical contact with either the right contact point 3f or the left contact point 3g.

Next, when the right turn of the vehicle has been completed, and the driver is canceling the rightward positioning of the steering gear of the vehicle which was used for performing this right turn, as he rotates the steering wheel 1 and the rotatable tube 3b rotationally coupled thereto in the anticlockwise direction in the figure, after this turning has proceeded by more than a certain amount one of the projecting ribs 3b2 and 3b3 comes into contact with the rib engaging projection 9c of the left turn switch member 9, and substantially simultaneously the other of the projecting ribs 3b2 and 3b3 comes into engagement with the obliquely angled side of the rib engaging projection 8c of the right turn switch member 8. Because of the particular configuration of the parts, as shown, as the steering wheel 1 of the vehicle and the rotatable tube 3b coupled thereto are further turned in the anticlockwise direction from this condition, the pressure of the first abovementioned projecting rib on the rib engaging projection 9c of the left turn switch member 9 tends to rotate the left turn switch member 9 about the left mounting pin 3i, without substantially displacing this left turn switch member 9 so as to move the slot 9a formed therein along the left mounting pin 3i in the longitudinal direction of the slot 9a, and accordingly the left turn switch member 9 is substantially only displaced in a rotational fashion, and thereby the torsion coil spring 10 connected to the left turn switch member 9 is compressed, and the left turn switch member 9 is moved to a position rotationally displaced from its position shown in FIG. 5 by solid lines, so that the contact spring engaging projection 9b thereof displaces the left hand part of the contact spring member 11 in FIG. 5 very substantially in the left hand direction so that said contact spring member 11 comes into contact with the left contact point 3g. On the other hand, the pressure of the other projecting rib on the obliquely sloping surface of the right turn switch member 8 does not substantially rotate the right turn switch member 8, but pushes it along the right mounting pin 3h, so that the slot 8a in the right turn switch member 8 is slid in its longitudinal direction along the right mounting pin 3h, somewhat compressing the torsion coil spring 10 connected to the right turn switch member 8, so that the right turn switch member 8 is moved to a position somewhat translationally displaced from its position shown in FIG. 5 by the solid lines, pushing against the right hand portion of the contact spring member 11 so as to displace it to a certain extent rightwards, but not so far as to bring said contact spring member 11 into contact with the right contact point 3f. Thus, in this condition, the contact spring member 11 is brought into electrical contact with the left contact point 3g, but not with the right contact point 3f.

As the steering wheel 1 of the vehicle and the rotatable tube 3b rotationally coupled thereto are further rotated in the anticlockwise direction from this condition, the projecting ribs 3b2 and 3b3 move past the rib engaging projection 8c of the right turn switch member 8 and the rib engaging projection 9c of the left turn switch member 9, and accordingly these switch members 8 and 9 are released so as to be biased by the respective torsion coil springs 10 coupled thereto back to their positions shown in FIG. 5 by the solid lines, i.e. their neutral positions. And in this case the left and right hand sides in FIG. 5 of the contact spring member 11 are also returned to their positions shown by the solid lines, so that the contact spring member 11 is not in electrical contact with either the right contact point 3f or the left contact point 3g.

Thus, in summary, when the vehicle is steered around a right turn, first the contact spring member 11 is brought into electrical contact with the right contact point 3f, and then subsequently the contact spring member 11 is brought into electrical contact with the left contact point 3g.

On the other hand, in the case of a left turn, as the driver of the vehicle turns first the steering wheel 1 of the vehicle and the rotatable tube 3b rotatably coupled thereto in the anticlockwise rotational direction, and secondly in the clockwise rotational direction, first the electrical connection between the contact spring member 11 and the left contact point 3g only occurs, and secondly the electrical connection between the contact spring member 11 and the right contact point 3f only occurs, in a similar but reversed manner as the operation described above with regard to a right turn of the vehicle.

In this third embodiment, from the order in which electrical connection is made between the contact spring member 11 and either of the left contact point 3g and the right contact point 3f, it may also be determined whether the steering wheel 1 of the vehicle was first turned in the anticlockwise rotational direction in order to negotiate a left hand turn, and then was turned in the clockwise rotational direction in order to cancel the steering action necessary for this left hand turn, or whether on the other hand the steering wheel of the vehicle was first turned in the clockwise rotational direction in order to negotiate a right hand turn, and then was turned in the anticlockwise rotational direction in order to cancel the steering action necessary for this right hand turn. Of course, this function is again only available from the construction as described above when the amount of turning of the steering wheel 1 of the vehicle, during the negotiation of the left or the right hand turn, is greater than a certain predetermined amount, which in the shown embodiment is the same predetermined amount, 90°, both for a left hand turn, and for a right hand turn.

In this third preferred embodiment, it is also not necessary to provide any anti jam mechanism such as the anti jam system provided in the first embodiment, because there is no possibility of the projecting ribs 3b2 or 3b3 jamming against the right turn switch member 8 or the left turn switch member 9, due to the provision of the slots 8a and 9a by which these switch members are engaged to the right and left mounting pins 3h and 3i, this construction ensuring that no such jamming can possibly occur.

In the foregoing discussion, three preferred embodiments of the rotational direction sensor according to the present invention have been described. Now, an explanation will be made of a circuit for a direction indication system for an automotive vehicle, in which any one of these three preferred embodiments of the rotational direction sensor according to the present invention may be used.

Figure 6:
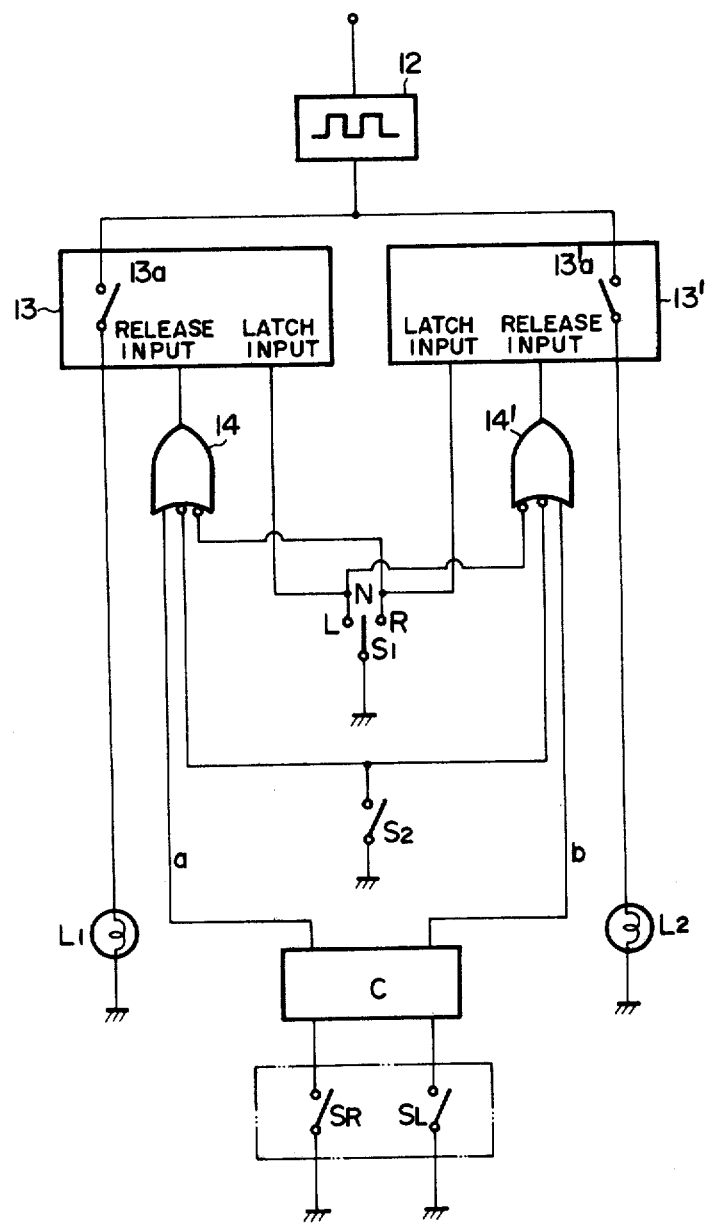
FIG. 6 is a circuit diagram, shown in part block diagram form, explaining a particular electrical circuit construction with which the rotational direction sensor according to the present invention may be used, in order to provide a vehicle direction indicating system.

In FIG. 6, the switch which is closed when the rotatable tube 3b is rotated in the clockwise rotational direction by more than a certain predetermined amount, i.e. the switch comprising the common contact plate 4b1 and the lower or right contact plate 4b3 in the first preferred embodiment shown in FIGS. 1-3, the switch comprising the contact element 6d and the contact plate 3f in the second preferred embodiment shown in FIG. 4, and the switch comprising the contact spring member 11 and the right contact plate 3f in the third preferred embodiment shown in FIG. 5, is designated as $S_R$; and, similarly, the switch which is closed when the rotatable tube 3b is rotated in the anticlockwise rotational direction by more than a certain predetermined amount, i.e. the switch comprising the common contact plate 4b1 and the upper or left contact plate 4b2 in the first embodiment shown in FIGS. 1-3, the switch comprising the contact element 6d and the contact plate 3g in the second preferred embodiment shown in FIG. 4, and the switch comprising the contact spring member 11 and the left contact point 3g in the third preferred embodiment shown in FIG. 5, is designated as $S_L$. Thus, in each of the first, second, and third preferred embodiments, $S_R$ is the switch which closes when the rotatable tube 3b is rotated clockwise, and $S_L$ is the switch which is closed when the rotatable tube 3b is rotated anticlockwise.

The reference numeral 12 denotes a turn signal flasher, which supplies an intermittent signal from a DC power source such as the battery of the automotive vehicle to two turn signal latch circuits 13 and 13'. The turn signal latch circuit 13 turns on the switch 13a comprised in it, when supplied with a signal from the L terminal of a turn signal control switch $S_1$, and retains this turning on of the switch 13a until supplied with a release signal from an OR circuit 14. Similarly, the turn signal latch circuit 13' turns on the switch 13'a comprised in it, when supplied with a signal from the R terminal of the turn signal control switch $S_1$, and retains this turning on of the switch 13'a until supplied with a release signal from an OR circuit 14'. The intermittent signal from the turn signal flasher 12 is supplied to the switches 13a and 13'a, and when transmitted through one or the other of these switches flashes the right or the left turn signal lamp combination $L_1$ or $L_2$. Thus, in order to initiate flashing of the turn signal lamps $L_1$ or $L_2$, in order to indicate a right or a left turn, it is only necessary for the driver of the vehicle to displace the operating lever of the switch $S_1$ to the right or the left, and then this operating lever may be allowed to return to its neutral position N, to which it is biased by a spring or the like, and at this time the flashing of the direction signal lamps will be continued, and this flashing is only stopped when a cancel signal is received by the appropriate turn signal latch circuit 13 or 13' from the appropriate OR circuit 14 or 14'.

Each of the OR circuits 14 and 14' is supplied with three inputs: one input from a direction signal cancel switch $S_2$; another input from the opposite side of the direction signal control switch $S_1$; and a third input from an order detecting circuit C. Thus, when any one of these three inputs of one of these OR circuits 14 and 14' is in high signal state, the flashing of the turn signal lamps on the appropriate side of the vehicle is canceled.

The switch $S_2$ is normally open, but if the driver of the vehicle manually closes said switch $S_2$ by hand then the flashing of the turn signals may be manually canceled. Thus, this switch $S_2$ is a manual turn signal cancel switch.

The supply of an input to, for example, the OR circuit 14, which controls canceling of the flashing of the left side turn signal lamps $L_1$ of the vehicle, from the R terminal of the direction signal control switch $S_1$, ensures that if immediately after a left turn a right turn is signalled on said direction signal control switch $S_1$, then this indicating of a right turn automatically and immediately cancels the previous indicating of a left turn. Accordingly, there is no possibility that the direction indication turn signals $L_1$ and $L_2$ on both of the sides of the vehicle should be flashed at the same time.

The input a to the OR circuit 14, and the input b to the OR circuit 14', are despatched from an order detecting circuit C which will be described hereinafter. Functionally, the order detecting circuit C provides said output signal a when the switch $S_R$ is closed after the switch $S_L$ is closed, and provides said output b when the switch $S_L$ is closed after the switch $S_R$ is closed. Accordingly, a proper canceling function for the direction signal latch circuits 13 and 13' is available.

In more detail, and with reference to FIG. 7 which shows an example of an internal construction for the order detecting circuit C, the action of said order detecting circuit C for canceling the indication of a right turn, by canceling the flashing of the right turn signal lamp combination $L_2$ which has been set flashing by flipping the switch $S_1$ to the R side, will be explained. The corresponding explanation about the cancellation of a left turn indication, which is quite the same, mutatis mutandis, will be herein omitted in the interests of brevity of description.

When $S_1$ has been flipped to the R side, accordingly latching the turn signal latch circuit 13' and starting the flashing of the signal lamp combination $L_2$, then turning of the steering wheel 1 of the automobile to the right, i.e. in the clockwise direction, through more than said certain predetermined angle, causes the switch $S_R$ to be turned on at least once; and when $S_R$ is turned on a trigger signal is supplied to the clock terminal $C_L$ of the flipflop $F_2$. Since the terminal Q, and therefore the data terminal D connected thereto, of the flipflop $F_2$ is at a high signal level when in a waiting state, the state of the terminal Q of said flipflop $F_2$ changes from the low level to the high level at this moment. In this case, since the flipflop $F_4$ is also in a waiting state, its terminal Q, and therefore its data terminal D which is connected thereto, is in the high signal state, while its Q terminal is in the low signal state. Therefore the data terminal D of the flipflop $F_1$ is also in the low signal state, and the terminal Q of the flipflop $F_1$, which receives the trigger signal from the terminal Q of the flipflop $F_2$ at its clock terminal $C_L$, remains in the low signal state. On the other hand, by the flipflop $F_2$ being changed over so that its terminal Q becomes in the high signal state, the data terminal D of the flipflop $F_3$ becomes in the high signal state.

Now, when the steering wheel 1 of the vehicle is turned in the anticlockwise direction after completing the right turn, then the switch $S_L$ is closed. At this time, since a trigger signal is supplied to the clock terminal $C_L$ of the flipflop $F_4$, which has been in the waiting state, then the output of its terminal Q changes from the low state to the high state. Therefore, since the data terminal D of the flipflop $F_3$ is in the high state due to the preceding closing of the switch $S_R$, the supply of the high signal from the Q terminal of the flipflop $F_4$ to the clock terminal $C_L$ of the flipflop $F_3$ changes over the flipflop $F_3$ so that a high signal is dispatched from the terminal Q of the flipflop $F_3$. This high signal from the Q terminal of the flipflop $F_3$ is supplied to the OR circuit 14', and this supplies a release signal to the turn signal latch circuit 13' so as to turn off the switch 13'$a$ and to turn off the light $L_2$.

The high signal from the terminal Q of the flipflop $F_3$ is also supplied to the OR circuit 15, also causing the monostable multivibrator 16 to be triggered, and, as the latch circuit 13' is released, a signal is supplied to the reset terminals R of all the flipflops $F_1$–$F_4$, thus restoring these flipflops $F_1$–$F_4$ to the waiting state again.

It may occur that, after flashing of the right signal lamp combination $L_2$ has been started by flipping the switch $S_1$ to the R side, the steering wheel 1 is turned to the left and then to the right, because of an approaching car or the like, causing the switches $S_L$ and $S_R$ to be turned on in that order. In such a case, all that happens is that a trigger signal is supplied to the clock terminal $C_L$ of the flipflop $F_3$ when its D or data terminal, i.e. the Q terminal of the flipflop $F_2$, is in the low signal state, and at this time the OR circuit 14' does not produce any release signal, and the right signal lamp combination $L_2$ continues flashing.

Figure 7:
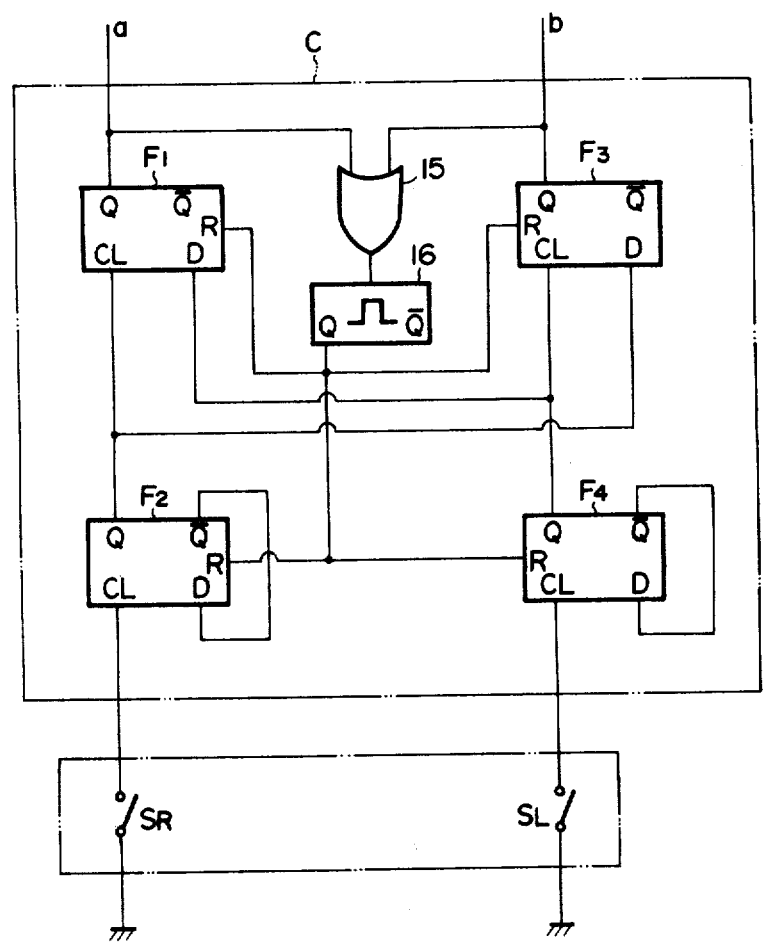
FIG. 7 is a circuit diagram, shown in part block diagram form, showing the construction of an order detecting circuit C incorporated in the circuit diagram shown in FIG. 6.

Thus, it is seen that according to the operation of the circuit shown in FIGS. 6 and 7, the right signal lamp combination $L_2$ is only stopped from flashing when the switches $S_R$ and $S_L$ are turned on in that order. Similarly, the left signal lamp combination $L_1$ is only stopped from flashing, when the switches $S_L$ and $S_R$ are turned on in that order.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

We claim:

1. A rotational sensor for a body which has a preferred neutral rotational position, and which is rotatable from said neutral position in either a clockwise rotational direction or an anticlockwise rotational direction about an axis, said rotational direction sensor comprising:

(a) an actuating assembly, which is rotated according to said rotation of said rotational body;

(b) a first switching means for switching electrical current, which is actuated by rotation of said actuating assembly in a clockwise rotational direction by more than a first predetermined amount from a first neutral rotational position and which is also actuated by rotation of said actuating assembly in a clockwise rotational direction from a second rotational position to said first neutral rotational position, said second rotational position being defined by rotation of said actuating assembly by more than said first predetermined amount in an anticlockwise rotational direction from said neutral position, said first switching means, when actuated, at least momentarily conducting a first electric current, said first switching means not being actuated by rotation of said actuating assembly in the anticlockwise rotational direction, irrespective of the amount of said anticlockwise rotation;

(c) a second switching means for switching electrical current, which is actuated by rotation of said actuating assembly in an anticlockwise rotational direction by more than a second predetermined amount from said first neutral rotational position and which is also actuated by rotation of said actuating assembly in an anticlockwise rotational direction from a third rotational position to said first rotational position, said third rotational position being defined by rotation of said actuating assembly by more than said second predetermined amount in a clockwise rotational direction from said neutral position, said second switching means, when actuated, at least momentarily conducting a second electric current, said second switching means not being actuated by rotation of said actuating assembly in the clockwise rotational direction, irrespective of the amount of said clockwise rotation; and (d) an electrical circuit which detects the switched electrical currents from said first and said second switching means, said electrical circuit generating a first electrical signal when it detects that said first and said second switching means are actuated successively in the order of actuation of said first and then said second switching means, and generating a second electric signal when it detects that said first and said second switching means are actuated successively in the order of actuation of said second and then said first switching means.

2. A rotational direction sensor according to claim 1, wherein said actuating assembly is formed with first and second irregularities spaced apart from one another by an angle of approximately 180° with respect to said axis; wherein said first switching means comprises a first switch which comprises a first switch member which is displaced in a first manner by force exerted thereon by one of said first and said second irregularities formed on said actuating assembly when said actuating assembly is rotated in the clockwise rotational direction, and which is displaced in a second manner by force exerted thereon by one of said first and said second irregularities formed on said actuating assembly when said actuating assembly is rotated in the anticlockwise rotational direction; and wherein said second switching means comprises a second switch which comprises a second switch member which is displaced in a third manner by force exerted thereon by one of said first and said second irregularities formed on said actuating assembly when said actuating assembly is rotated in the anticlockwise rotational direction, and which is displaced in a fourth manner by force exerted thereon by one of said first and second irregularities formed on said actuating assembly when said actuating assembly is rotated in the clockwise rotational direction; said first and second switch members being substantially separate members, wherein when said first switch member is displaced by said first irregularity in said first manner said second switch member is displaced by said second irregularity in said fourth manner, and when said second switch member is displaced by said first irregularity in said third manner said first switch member is displaced by said second irregularity in said second manner.

3. A rotational direction sensor according to claim 2, wherein said first switch comprises a first contact element, electrical connection to which is altered when said first switch member is displaced in said first manner, but electrical connection to which is not altered when said first switch member is displaced in said second manner; and said second switch comprises a second contact element, electrical connection to which is altered when said second switch member is displaced in said third manner, but electrical connection to which is not altered when said second switch member is displaced in said fourth manner.

4. A rotational direction sensor according to claim 3, further comprising first and second fixed mounting pins and first and second means for biasing said first and second switch members respectively, wherein each of said first and said second switch members is formed with a slot which is engaged over said first or said second mounting pin respectively; each of said first and second switch members being biased by its said biasing means to a stop position wherein its respective mounting pin is at the end of its respective slot remote from said axis; wherein each of said first and second switch members is formed with a first surface which, when said switch member is in its said stop position, extends substantially along the radial direction from said axis, and with a second surface, on its side closest to said actuating assembly, angled obliquely to radii extending from said axis; wherein, when such an irregularity is moved, by rotation of said actuating assembly, so as to impinge upon one of said first and second switch members against its said first surface, it rotates said switch member about its said mounting pin which remains at said end of said slot in said switch member remote from said axis, said mode of movement being said first or third manner, respectively; and wherein, when such an irregularity is moved, by rotation of said actuating assembly, so as to impinge upon one of said first and second switch members against its said second surface, it slides said switch member so that its said slot moves along its said mounting pin, said switch member not being substantially rotated at this time, said mode of movement being said second or said fourth manner, respectively.

5. A rotational direction sensor according to claim 1, wherein said actuating assembly is formed with at least one irregularity; and further comprising a switch member which is displaced in a first manner by force exerted thereon by an irregularity formed on said actuating assembly when said actuating assembly is rotated in the clockwise rotational direction, and which is displaced in a second manner by force exerted thereon by an irregularity formed on said actuating assembly when said actuating assembly is rotated in the anticlockwise rotational direction; said first switching means being actuated when said switch member is displaced in said first manner, and said second switching means being actuated when said switch member is displaced in said second manner.

6. A rotational direction sensor according to claim 5, further comprising a body member; said switch member being slidably mounted within said body member, and sliding displacement of said switch member in a certain direction with respect to said body member constituting displacement of said switch member in said first manner, while sliding displacement of said switch member with respect to said body member in the direction opposite to said certain direction constitutes displacement of said switch member in said second manner.

7. A rotational direction sensor according to claim 5, further comprising a body member; said switch member being rotatably mounted to said body member, and rotational displacement of said switch member in a certain rotational direction with respect to said body member constituting displacement of said switch member in said first manner, while rotational displacement of said switch member with respect to said body member in the rotational direction opposite to said certain rotational direction constitutes displacement of said switch member in said second manner.

8. A rotational direction sensor according to claim 6, wherein said first switching means comprises a first contact element, connection to which is altered when said switch member is slidingly displaced in said certain direction; and wherein said second switching means comprises a second contact element, electrical connection to which is altered when said switch member is slidingly displaced in the direction opposite to said certain direction.

9. A rotational direction sensor according to claim 8, wherein said switch member comprises a projection which is pushed by said at least one irregularity.

10. A rotational direction sensor according to any one of claims 5, 6, 8, or 9, wherein said actuating assembly is formed with exactly two and no more such irregularities, said two irregularities being spaced apart from one another by an angle of approximately 90° with respect to said axis, and wherein, when said actuating assembly is in said neutral rotational position, said switch member is located at a position substantially symmetrical with respect to said two irregularities, said first and second predetermined amounts being approximately 45°.

11. A rotational direction sensor according to claim 7, wherein said first switching means comprises a first contact element, connection to which is altered when said switch member is displaced in said certain rotational direction; and wherein said second switching means comprises a second contact element, electrical connection to which is altered when said switch member is displaced in said rotational direction opposite to said certain rotational direction.

12. A rotational direction sensor according to claim 11, wherein said actuating assembly is formed with exactly two and no more such irregularities, said two irregularities being spaced apart from one another by an angle of approximately 180° with respect to said axis; and wherein said switch member is formed with two prongs which extend therefrom to terminate at their ends on opposite sides of said actuating assembly; said ends being formed with surfaces, on their sides closest to said actuating assembly, angled at oblique angles to radii extending from said axis, and being formed with end surfaces which extend substantially along the radial direction from said axis; wherein, when said actuating assembly is in said neutral rotational position, said prongs of said switch member are located at positions substantially symmetrical with respect to said irregularities; and said first and second predetermined amounts being approximately 90°.

* * * * *